United States Patent
Wang et al.

(10) Patent No.: US 6,366,453 B1
(45) Date of Patent: Apr. 2, 2002

(54) PLANAR DISPLAY UNIT THAT IS SEPARABLY CONNECTED TO A COMPUTER

(75) Inventors: Chien-Jui Wang, Hsin-Chu; Chang-I Tseng, San-Chung; Yung-Chuan Ma, Kao-Hsiung Hsien; Chia-Chuan Lin, Taipei Hsien, all of (TW)

(73) Assignee: Acer Incorporated, Hsichih (TW)

(*) Notice: Subject to any disclaimer, the term of this patent is extended or adjusted under 35 U.S.C. 154(b) by 0 days.

(21) Appl. No.: 09/614,569

(22) Filed: Jul. 12, 2000

(30) Foreign Application Priority Data

Apr. 14, 2000 (TW) .......................................... 089106981

(51) Int. Cl.[7] .................................................. G06F 1/16
(52) U.S. Cl. .................... 361/681; 361/796; 312/223.2; 364/708.1; 248/917
(58) Field of Search ................................ 361/681, 679, 361/680, 682–687, 724–727, 752, 755, 796, 826–827; 364/708.1, 709.11; 312/223.2; 345/169, 905; 206/305, 320, 576; 248/917–923

(56) References Cited

U.S. PATENT DOCUMENTS

| | | | | |
|---|---|---|---|---|
| 5,805,190 A | * | 9/1998 | Tsuchii et al. | 347/100 |
| 6,168,124 B1 | * | 1/2001 | Matsuoka et al. | 248/176.1 |
| 6,268,997 B1 | * | 7/2001 | Hong | 361/681 |

* cited by examiner

*Primary Examiner*—Leo P. Picard
*Assistant Examiner*—Hung Van Duong
(74) *Attorney, Agent, or Firm*—Winston Hsu

(57) ABSTRACT

A planar display unit that can be easily attached to or separated from a computer has a flat panel display and a base,. The flat panel display is rotatably set upon the base. The housing of the computer and the base of the planar display unit are designed to mate together, connecting the planar display unit to the computer. The computer has at least one storage device for the reading and writing of data. The planar display unit includes several power and signal contacts to obtain electrical power and signal data from the computer.

10 Claims, 3 Drawing Sheets

PLANAR DISPLAY UNIT THAT IS SEPARABLY CONNECTED TO A COMPUTER

BACKGROUND OF THE INVENTION

1. Field of the Invention

The present invention relates to a planar display unit, and more specifically, to a planar display unit that can be attached and detached from a computer.

2. Description of the Prior Art

For information-processing apparatuses, a display is used to display the information that is being processed, such as text or image information. With the advances in technology, the current display is a flat panel display, instead of an outdated cathode ray tube (CRT). Such displays are more compact, and also emit less radiation than their predecessors. The most popular planar display for information processing apparatuses is a liquid crystal display (LCD).

An all-in-one LCD-PC is made by assembling a planar display and a host computer inside a housing. Such a device is both compact and relatively easy to use. The planar display is more expensive than the host computer, but it has a longer useful life. However, when part of the host computer needs to be upgraded or goes out of use, the planar display, though still in good condition, is thrown away with the host computer. This is wasteful of both resources and money. Conversely, a variety of information apparatuses need to display image information, such as personal computers, video recorders, televisions, game consoles, etc. Hence, a typical family might possess a plurality of redundant displays, which is also wasteful. Additionally, if the host computer is in need of repair, the display can be scraped or otherwise damaged while servicing, which aggravates repair costs.

SUMMARY OF THE INVENTION

It is therefore a primary objective of the present invention to provide a planar display unit to solve the above-mentioned problem.

Briefly, in a preferred embodiment, the present invention provides a planar display unit that can be easily attached to or separated from a computer. A planar display unit has a flat panel display and a base. The flat panel display is rotatably set upon the base. The housing of the computer and the base of the planar display unit are designed to mate together, connecting the planar display unit to the computer. The computer has at least one storage device for the reading and writing of data.

It is an advantage of the present invention that the planar display unit can be easily attached to or separated from the housing of the computer so that when the computer is shipped for servicing, the planar display unit can be detached from the computer, avoiding potential damage to the planar display unit.

These and other objectives and advantages of the present invention will no doubt become obvious to those of ordinary skill in the art after having read the following detailed description of the preferred embodiment, which is illustrated by the various figures and drawings.

DETAILED DESCRIPTION OF THE PREFERRED EMBODIMENT

Figure 3:
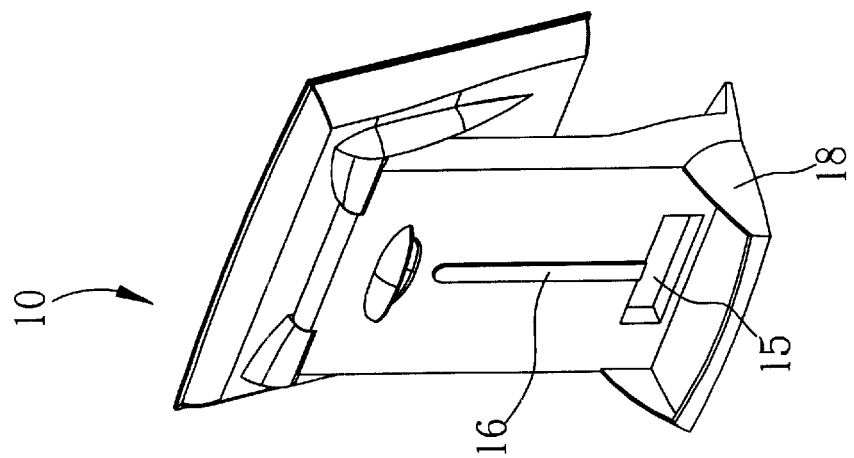
FIG. 1 to FIG. 3 are perspective views of a planar display unit according to the present invention.
Figure 2:
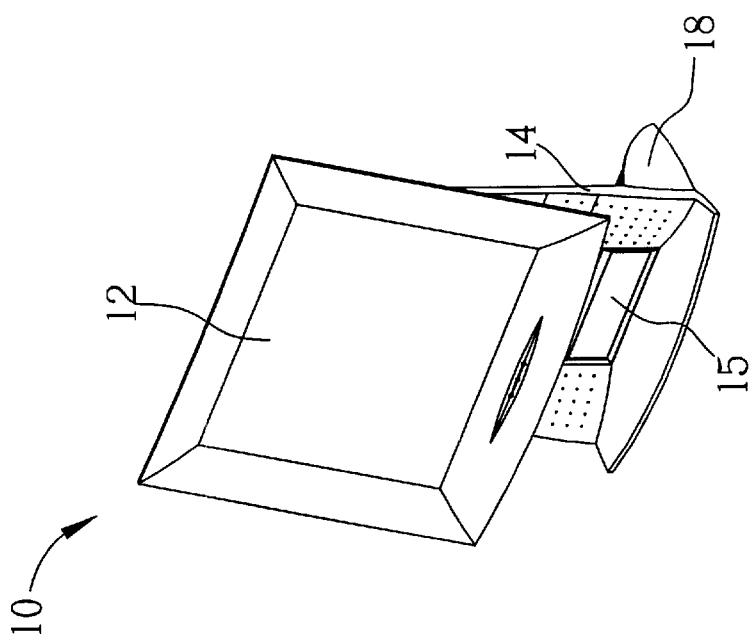
Figure 1:
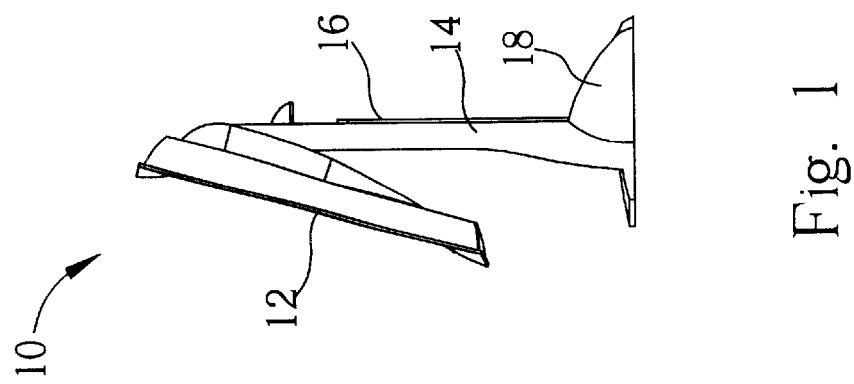
Figure 6:
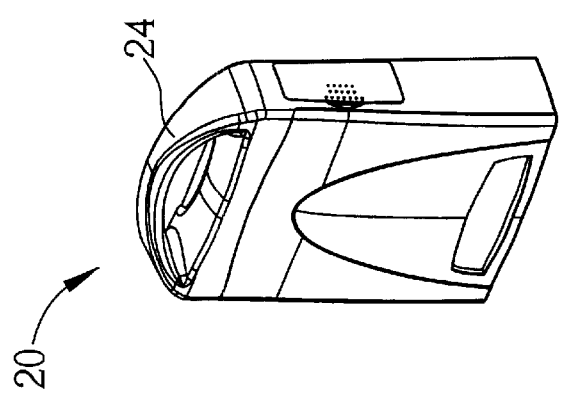
FIG. 4 to FIG. 6 are perspective views of a computer according to the present invention.
Figure 5:
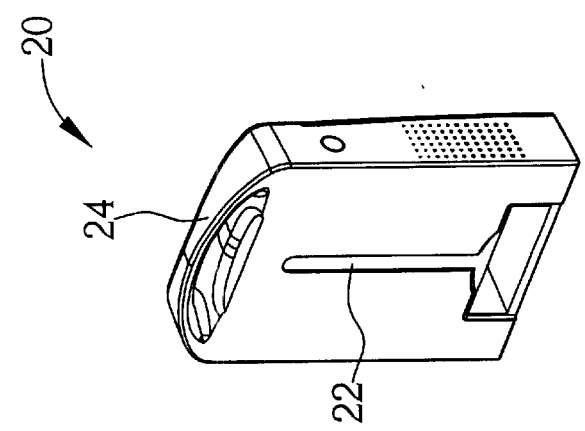
Figure 4:
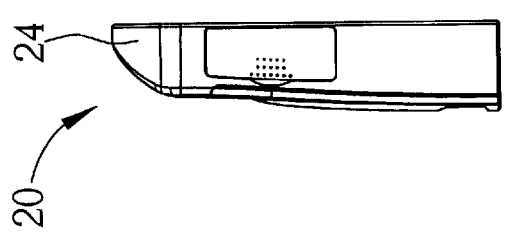

Please refer to FIG. 1 to FIG. 6. FIG. 1 to FIG. 3 are perspective views of a planar display unit 10 according to the present invention. FIG. 4 to FIG. 6 are perspective views of a computer 20 according to the present invention. The planar display unit 10 comprises a flat panel display 12 and a base 14. The base 14 comprises a protruding portion 16, extending from a side of the base 14. The flat panel display 12 is mounted on the base 14 in a rotatable manner, which permits a user to adjust the viewing angle of the flat panel display 12. The protruding portion 16 of the base 14 is inserted into a recess 22 of the computer 20, which connects the planar display unit 10 to the computer 20. The computer 20 comprises a handle 24 to facilitate the attaching and detaching of the planar display unit 10 to the computer 20.

The base 14 also comprises a stand 18, which is on the same side of the base 14 as the protruding portion 16. When the protruding portion 16 of the base 14 mates with the recess 22 of the computer 20, the computer 20 will rest on the stand 18. The protruding portion 16 of the base 14 is a relatively long vertical track, with a length that is greater than its width. The computer 20 slides vertically along the protruding portion 16 onto the stand 18 of the base 14, the protruding portion 16 mating with the recess 22 of the computer 20. With the flat panel display 12 rotatably mounted onto the base 14, users can adjust the viewing angle of the planar display unit panel 12 in either a clockwise or counterclockwise direction.

Figure 9:
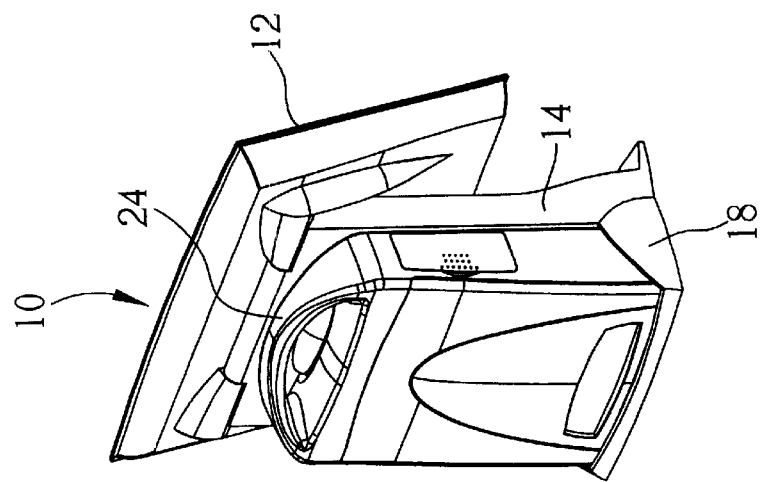
FIG. 7 to FIG. 9 are perspective views of combining the planar display unit in FIGS. 1 to 3 and the computer in FIGS. 4 to 6.
Figure 8:
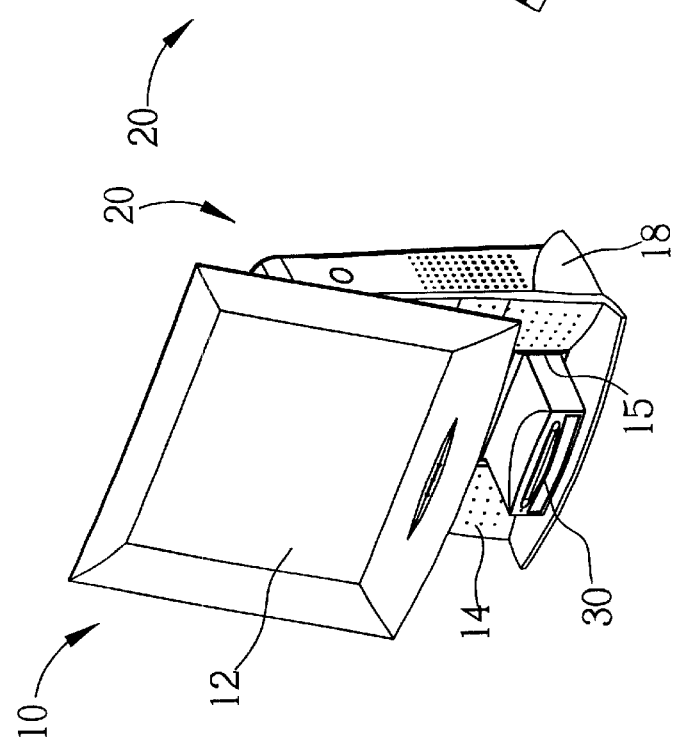
Figure 7:
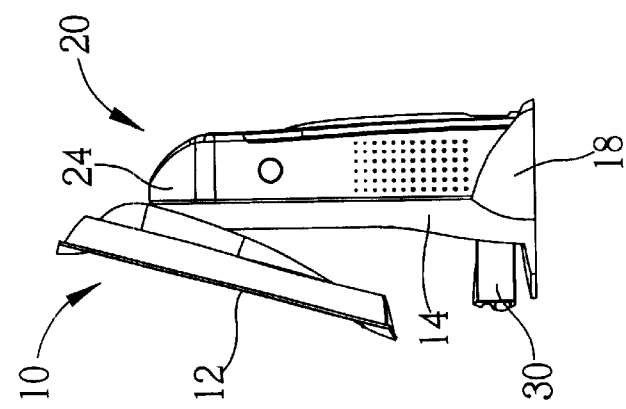

Please refer to FIG. 7 to FIG. 9. FIG. 7 to FIG. 9 are perspective views of combining the planar display unit 10 with the computer 20. When the user places the computer 20 vertically onto the base 14 of the planar display unit 10, the long recess 22 of the computer 20 and the protruding portion 16 of the base 14 will mate together. Thus, the protruding portion 16 of the base 14 will be inserted into the recess 22 of the computer 20. The computer 20 has at least one storage device 30, such as a CD ROM drive, to access external data. The storage device 30 is swappable. The base 14 has at least one opening 15 for receiving the storage device 30.

The protruding portion 16 of the base 14 has several power and signal contacts (not shown in the figures) The recess 22 of the computer 20 has several corresponding power and signal contacts (not shown in the figures). When the protruding portion 16 mates with the recess 22, the contacts of the protruding portion 16 connect with those of the recess 22. In this manner, the computer 20 delivers electrical power and signal data to the planar display unit 10.

The protruding portion 16 of the base 14 may only have signal contacts (not shown in the figures), and the recess 22 of the computer 20 may only have corresponding signal contacts (not shown in the figures). When the protruding portion 16 mates with the recess 22, the signal contacts of the protruding portion 16 connect with those of the recess 22. In this manner, the computer 20 delivers signal data to the planar display unit 10, and the planar display unit 10 has to have an external power cord (not shown) for receiving electric power required for its operation.

Because the planar display unit 10 according to the present invention can be easily separated from the computer, the planar display unit 10 can be utilized in various other devices, such as video recorders, TV sets, etc. It can also be used with other computer systems. Therefore, the planar display unit 10 according to the present invention offers more utilization options.

Compared with the prior art planar display unit, the planar display unit 10 according to the present invention uses a modular design to extend the product life time, offer more flexibility when upgrading, and improved customer service. The modularity of design offers more options to the user. The planar display unit 10 can be a liquid crystal display, and these can have various sizes such as 15-in and 17-in and can have different qualities. Similarly, various types of computers, with various functions, can be used. And, for each computer, differing types of storage devices, such as CD-ROM, CD-R/W, and DVD, can be swapped in and out. This modularity of design has economic advantages as well. Since each module is an independent unit, damage to one module won't affect the usage of others. For example, the planar display unit can be kept when the computer is replaced. Additionally, modularity of design prevents damage to other units during repairs. For example, if the computer breaks down, it can be separated from the planar display unit, and only the computer is sent out for repairs. The planar display unit need not be sent, thereby avoiding potential damage during shipping and handling.

Those skilled in the art will readily observe that numerous modifications and alterations may be made while retaining the teachings of the invention. Accordingly, the above disclosure should be construed as limited only by the metes and bounds of the appended claims.

What is claimed is:

1. A planar display unit that connects to a computer, the computer comprising a recess on a side, the planar display unit comprising:

a flat panel display for displaying an image frame; and a base upon which the flat panel display is set, the base comprising a protruding portion, a vertical height of the protruding portion of the base being greater than a horizontal width of the protruding portion;
      wherein the computer slides vertically along the protruding portion toward the base to mate the protruding portion of the base with the recess of the computer, connecting the planar display unit to the computer.

2. The planar display unit of claim 1 wherein the flat panel display is rotatably mounted on the base.

3. The planar display unit of claim 1 wherein the base further comprises a stand, and when the protruding portion of the base mates with the recess of the computer, the computer rests on the stand.

4. The planar display unit of claim 1 wherein the computer further comprises at least one storage device, the storage device is used for reading or writing data.

5. An information apparatus comprising:

a flat panel display for displaying an image frame;

a base upon which the flat panel display is set, the base having a protruding portion on a side, a vertical height of the protruding portion of the base being greater than a horizontal width of the protruding portion; and a computer for processing data, the computer having a recess on a side;
      wherein the computer slides vertically along the protruding portion toward the base to mate the protruding portion of the base with the recess of the computer, connecting the flat panel display with the computer.

6. The information apparatus of claim 5 wherein the flat panel display is rotatably set on the base.

7. The information apparatus of claim 5 wherein the base further comprises a stand, and when the protruding portion of the base mates with the recess of the computer, the computer rests on the stand.

8. The information apparatus of claim 5 further comprising at least one storage device.

9. The information apparatus of claim 5 wherein the computer is a personal computer.

10. The information apparatus of claim 8 wherein the storage device is in the computer.

* * * * *